May 11, 1937.  W. W. VOSPER  2,079,954
TURNING, FACING, AND THREADING TOOL
Filed Feb. 27, 1936  2 Sheets-Sheet 1
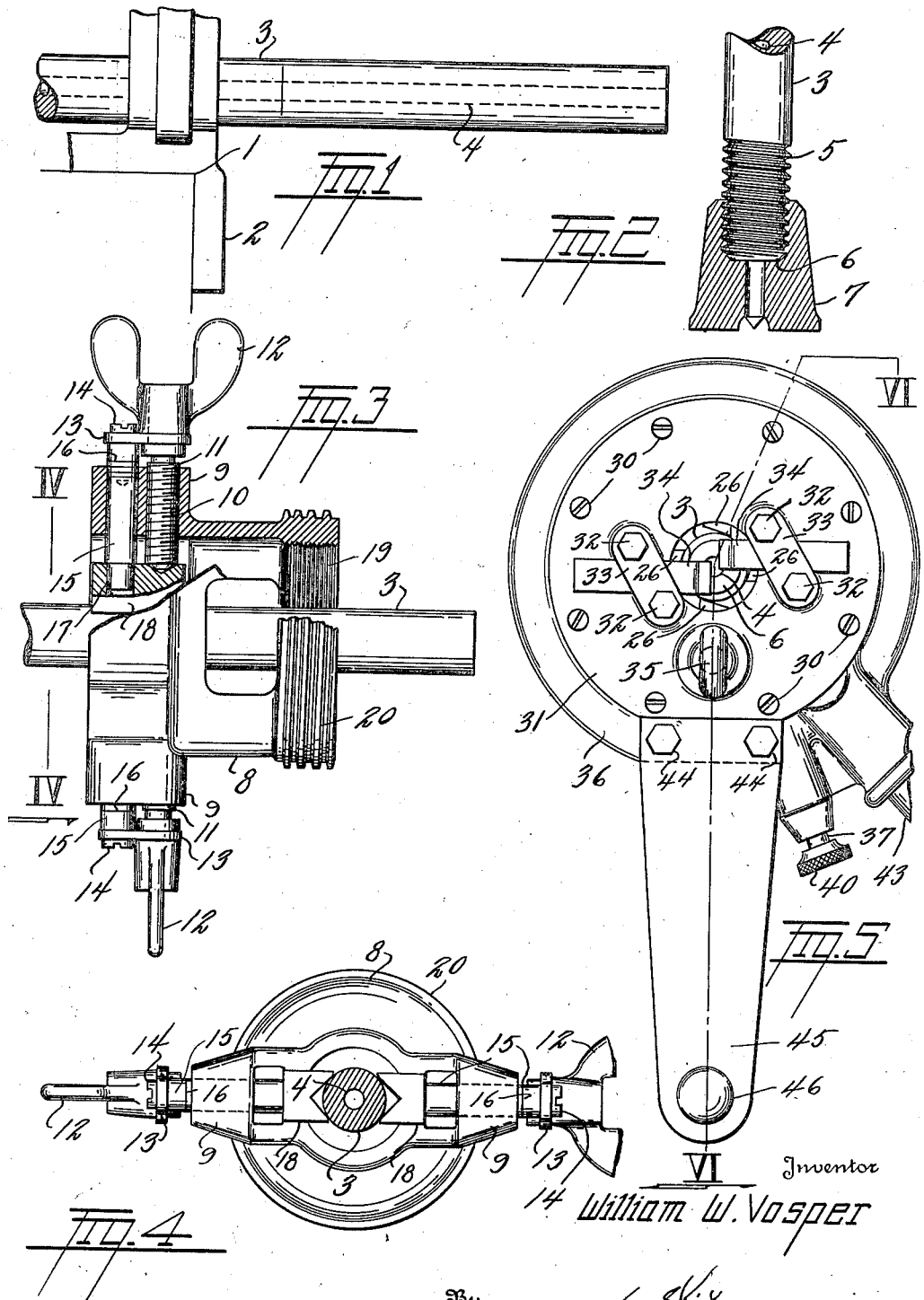
Inventor
William W. Vosper
By Geo. E. Kirk
Attorney

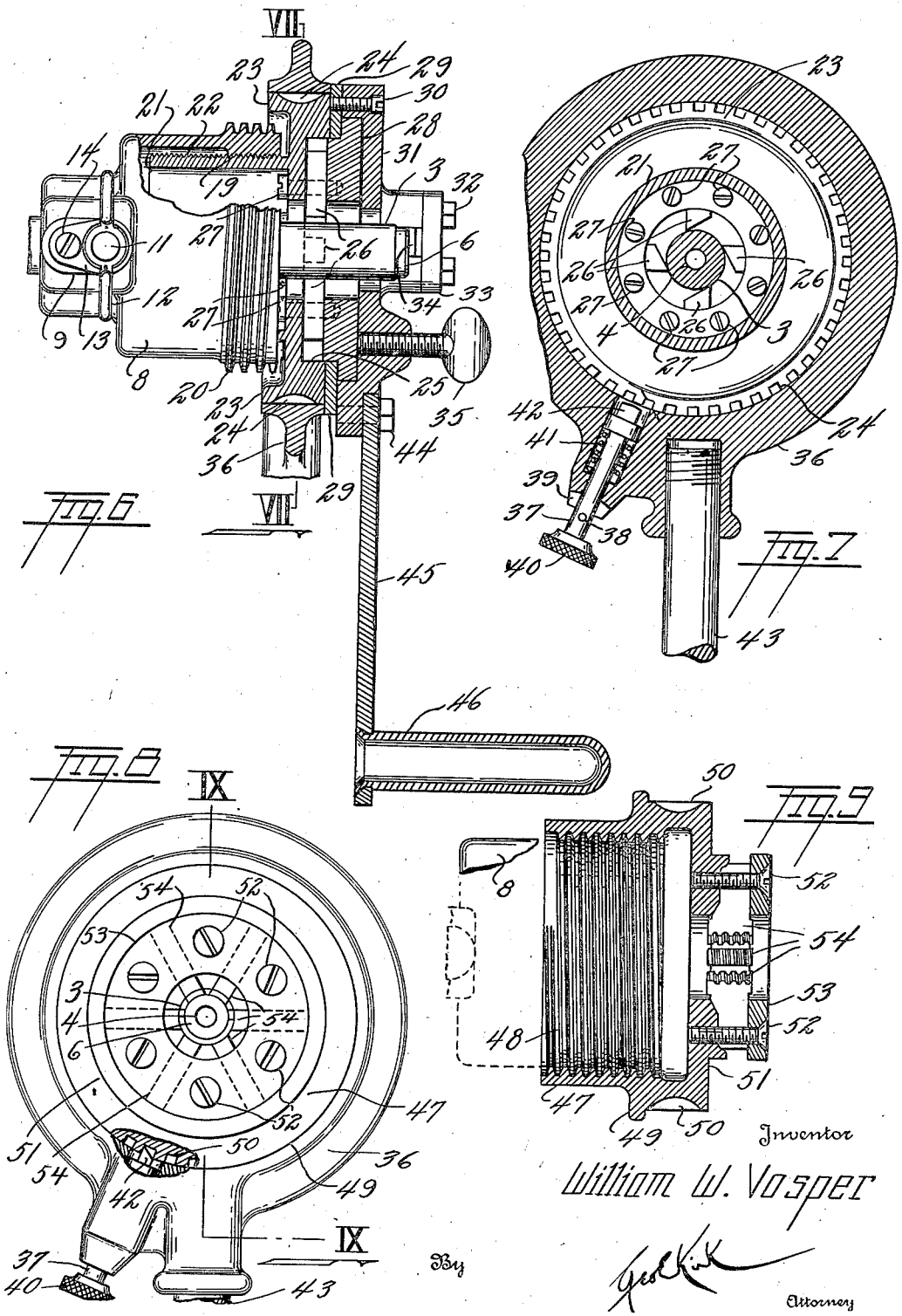

Patented May 11, 1937

2,079,954

UNITED STATES PATENT OFFICE 2,079,954

TURNING, FACING, AND THREADING TOOL

William W. Vosper, Toledo, Ohio, assignor to The Toledo Pipe Threading Machine Company, Toledo, Ohio, a corporation of Ohio Application February 27, 1936, Serial No. 66,108

6 Claims. (Cl. 82—4)

This invention relates to re-configuring metal bar or shaft portions.

This invention has utility when incorporated in apparatus for turning to diameter, facing and threading of drill shanks or stems for drill bits.

Referring to the drawings:

Fig. 1 is a fragmentary side elevation of a drill stem end mounted for receiving re-shaping attention;

Fig. 2 is a fragmentary view of a dressed drill stem end with bit attached thereto;

Fig. 3 is a fragmentary view of the primary sleeve in clamped position on a stock drill stem end or shank, as the work received for re-configuring;

Fig. 4 is a section on the line IV—IV, Fig. 3, looking in the direction of the arrow;

Fig. 5 is a side elevation of the actuator and a secondary sleeve, say as adapted for turning and end facing;

Fig. 6 is a section on the line VI—VI, Fig. 5;

Fig. 7 is a section on the line VII—VII, Fig. 6;

Fig. 8 is a view similar to Fig. 5 of an additional selectable secondary sleeve, adapted for thread cutting; and Fig. 9 is a section on the line IX—IX, Fig. 8.

Fixed table or work bench 1 (Fig. 1) is shown provided with vice 2 for mounting shank 3 of drill stem normally having central opening 4 therethrough. Such stem, in finished condition, is adapted to have selected type of external thread 5 (Fig. 2). The finished or dressed stem also terminally has terminal end facing 6. Coacting with the threads 5 is drill bit 7, adapted to rock drilling as in mineral and other development such as quarrying and tunneling.

Primary sleeve 8 (Fig. 3) is provided with a plurality of bosses 9 each carrying internally threaded way 10 for externally threaded set screw 11 to be actuated by wing terminal 12. The set screw 11 carries extension plate 13, with which is connected by screw 14, guide stem 15 having therealong graduations 16. This stem 15 has press-fit 17 with clamping jaw 18. As the wing terminal 12 is rotated to control the position of the jaw 18, the graduations 16 of one of these clamp devices may be checked with the other of such devices and thereby the operator may observe to have these graduations similarly tally. There is check for centrally mounting the primary sleeve 8 in clamped position upon the drill stem or work 3.

This primary sleeve 8, as thus centered with the work 3, has a plurality of feed control pitch thread means on its overhang portion away from the clamp. These control means comprise internal minor pitch threads 19 and external major pitch threads 20. In practice, the threads 20 correspond to the pitch desired for the thread 5 on the stock 3. The minor thread 19 may be desirable for a less axial feed rate from the pitch of the threads 20, as in turning to true up the external diameter of the stock 3 at the centered position therealong in the region of the primary sleeve 8.

Secondary sleeve 21 (Fig. 6) may be provided having external thread 22 complementary to the internal thread 19 as a lead thread in determining the axial feed between the sleeves 8 and selective for the sleeve 21. The sleeve 21 is provided with flange 23 having external ratchet 24. The flange 23 has therein overhang 25 in which may be located cutting tools 26 held by screws 27 from the sleeve protruding within the overhang to engage ring 28 in providing a cutting tool device. These cutting tools 26 may be in desired number, dimension and series arrangement. In the instance herein, these tools are located for effecting turning of the stock 3 to a cylindrical external configuration. The screws 27 engage the ring 28 to clamp the cutting tools 26 and provide clearance between the ring 28 and the flange 23. In this clearance is rotatably located ring 29 with which engages screws 30, mounting plate 31 in position to rotate on the ring 28.

From the plate 31 project screws 32 (Fig. 5) adapted to mount clamp plates 33 and thereby position cutting tool elements 34. The plate 31 locates these cutting tool elements 34 axially spaced from the cutting tool elements 26. The elements 34 may desirably be brought to location terminally of the stock 3. To this end these cutting tool elements 34, as clamped, may provide a working series of tool elements for producing the facing 6 on the stock 3 of the desired contour, whether radial plane, peripherally beveled, or in such form as may be desired. Set screw 35 has threaded engagement with the plate 31 and extends therethrough to be brought into frictional clamp-effecting relation with the ring 28.

About the flange 23 is drive device, comprising ring 36 (Fig. 7). Clutch stem 37 therein is a manually operable control connecting and disconnecting means. This stem 37 has cross pin 38 which, as located out of slot 39 by drawing radial outward head 40 against the resistance of spring 41, locates tooth 42 crosswise of and out of mesh with the ratchet teeth 24. The drive ring 36 is accordingly loose. Upon rotating this stem 37 so that the pin 38 may enter the slot 39 as urged by the spring 41, the one side beveled terminal of the tooth 42 selects direction driving connection with the ratchet 34. Radially extending handle 43 may then be rocked to and fro either for clockwise or counter-clockwise rotation of the drive, according to the clutch connection effective by the ratchet tooth 42. In this connection, there may be a feed in the event the lead threads 19, 22, be clockwise on the right hand rotation and a slacking off in the reverse setting of the ratchet 42. Contrariwise, if the lead thread be left hand, there is manual selection for the drive which may be for left hand operation of the axial feed, and right hand for the backing away from the work.

In this feed control for axially shifting this secondary sleeve 21 as to the primary sleeve 8 and with this set screw 35 effective to lock the plate 31 with the flange 23, the cutting elements 34 may be brought into the desired working position at a terminus of the stock 3. Notwithstanding there is the leverage from the handle 43 to effect the feed at a mechanical advantage, in practice, a terminal facing is desirably controlled at a retarded rate. As the die or cutting tool elements 34 approach the working position at the end of the stock 3, the set screw 35 may be backed off to release the frictional or clamping connection between the plate 31 and the ring 28.

The operator may then rotate the plate 31 and the elements 34 relatively to the secondary sleeve 21. Screws 44 in plate 31 mounted radially-extending arm 45 carrying handle or grip 46. The tool operator may then actuate the handle 46 to rotate the plate 31 and the cutting elements 34 in effecting end facing for the stock 3. The feed may be one nicely determining the pressure or depth of cut for these elements 35 by the action of the operator through one hand engaging the grip 46 and the other hand engaging the handle 43 to hold the elements at the desired pressure into the work. Thus the end facing may be finished easily in a satisfactory manner. Thereafter the drive ring 36 may be disconnected and even removed from the position on the flange 23, and located on the primary sleeve 8. This is a desirable initial position therefor before bringing the secondary sleeve 21 into working relation.

Selectable secondary sleeve 47 (Fig. 9) may be brought into position to have internal thread 48 of this secondary sleeve 47 in cooperative relation with the complementary external thread 20 on the primary sleeve 8. This secondary sleeve 47 has flange 49 carrying ratchet teeth 50 similar to the ratchet teeth 24 of the flange 23 of the secondary sleeve 21. There is thus provided cooperative means for placing the drive ring 36 in position to actuate this second or selectable secondary sleeve 47 in the feeding in or out as determined by the lead thread and the direction of the ratchet connection and also whether such be clockwise or counter-clockwise, that is, right or left hand.

This secondary sleeve 48 has inwardly extending terminal portion 51 which may be engaged by screws 52 from ring 53 effective to mount cutting elements or thread chasing dies 54 in sequence for determining the selected thread of the pitch for the thread 5 on the stock 3. The pitch is determined by the thread 20 on the sleeve 8. This secondary selected sleeve 47 may, in the sequence herein disclosed, re-configure the stock 3 by forming thereon thread 5 in the centered relation determined by the primary sleeve 8, not only as to the end facing 6, dressed by the elements 34, but as to the re-turned exterior as effected by the cutting or turning dies 26.

There is accordingly herein provided, in a simple manually-operable tool, ranges for actuation and inter-control in the dressing features for effectively redressing an oil or other well drilling tool and rendering such tool effective to withstand the impacts of operation with all the niceties of accurate machine work thereon.

What is claimed and it is desired to secure by Letters Patent is:

1. In a re-shaping tool for cylindrical metal stock, a primary sleeve, a centering clamp anchor thereon for the stock to be acted upon, said sleeve forming a cylindrical overhanging extension laterally extending from the clamp and providing feed control threads, a secondary relatively telescoping sleeve having a complementary thread, a cutting tool device mounted on the secondary sleeve, an actuator arm, a connection for holding the arm against angular shifting relatively to the secondary sleeve for operating the device relatively to the sleeve, and a ratchet ring drive effective on release of said connection for said arm then to act through the drive and on the secondary sleeve for determining feed position for the device.

2. In a reshaping tool for cylindrical metal stock, a primary sleeve, clamp means mounted thereby for centering and anchoring said primary sleeve to the stock and against rotation relatively thereto, said primary sleeve providing feed control thread means, a secondary sleeve having complementary thread means for feed control, said secondary sleeve embodying a pair of relatively shiftable portions, cutter means mounted by each portion, and an independent drive for each portion.

3. In a reshaping tool for cylindrical metal stock, a primary sleeve, clamp means mounted thereby for centering and anchoring said primary sleeve to the stock and against rotation relatively thereto, said primary sleeve providing feed control thread means, a secondary sleeve having complementary thread means for feed control, said secondary sleeve embodying a pair of relatively shiftable portions, cutter means mounted by each portion, an independent drive for each portion, and means for locking said portions together whereby either cutter may be selectively operated independently or together to perform a plurality of operations on the stock in sequence or simultaneously.

4. In a reshaping tool for cylindrical metal stock, a primary sleeve, clamp means mounted thereby for centering and anchoring said primary sleeve to the stock and against rotation relatively thereto, said primary sleeve providing feed control thread means, a secondary sleeve having complementary thread means for feed control, said secondary sleeve embodying a pair of relatively shiftable portions, cutter means mounted by each portion, means for driving one portion of the secondary sleeve to respond to pitch control between the sleeves and a cutter, and means to drive the other portion of the secondary sleeve independently thereof to perform another cutting operation.

5. In a tool of the class described, a primary sleeve, clamp means mounted thereby for centering and anchoring said primary sleeve to the stock and against rotation relatively thereto, said primary sleeve providing annularly complete different pitch feed control means, secondary sleeve means having cooperating pitch in maintaining assembly with the feed control means, said secondary sleeve means providing an overhang, a tool therein, a ring adjustable toward and from said secondary sleeve to lock the tool in said overhang and provide a clearway between said overhang and ring, a plate rotatable about said ring and held in assembled position thereon by an extension therefrom into the clearway, an additional tool carried by the plate for operating on the stock, and means to drive said plate relatively to the secondary sleeve.

6. In a tool of the class described, a primary sleeve, clamp means mounted thereby for centering and anchoring said primary sleeve to the stock and against rotation relatively thereto, said primary sleeve providing annularly complete different pitch feed control means, secondary sleeve means having cooperating pitch in maintaining assembly with the feed control means, said secondary sleeve means providing an overhang, a tool therein, a ring adjustable toward and from said secondary sleeve to lock the tool in said overhang and provide a clearway between said overhang and ring, a plate rotatable about said ring and held in assembled position thereon by an extension therefrom into the clearway, an additional tool carried by the plate for operating on the stock, means for locking said plate against rotation relatively to said ring, and means for driving the secondary sleeve independently of the plate or the secondary sleeve and the plate when locked together.

WILLIAM W. VOSPER.